(12) United States Patent
Zhang

(10) Patent No.: US 11,410,629 B2
(45) Date of Patent: Aug. 9, 2022

(54) OUTPUT VOLTAGE REGULATING CIRCUIT AND LIQUID CRYSTAL DISPLAY DEVICE

(71) Applicant: Shenzhen China Star Optoelectronics Semiconductor Display Technology Co., Ltd., Shenzhen (CN)

(72) Inventor: Xianming Zhang, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 190 days.

(21) Appl. No.: 16/630,481

(22) PCT Filed: Dec. 4, 2017

(86) PCT No.: PCT/CN2017/114386
§ 371 (c)(1),
(2) Date: Jan. 13, 2020

(87) PCT Pub. No.: WO2019/015214
PCT Pub. Date: Jan. 24, 2019

(65) Prior Publication Data
US 2021/0082367 A1 Mar. 18, 2021

(30) Foreign Application Priority Data
Jul. 19, 2017 (CN) .......................... 201710591449.3

(51) Int. Cl.
*G09G 3/36* (2006.01)
*H02M 3/156* (2006.01)

(52) U.S. Cl.
CPC .......... *G09G 3/3696* (2013.01); *H02M 3/156* (2013.01)

(58) Field of Classification Search
CPC .......... G09G 3/3696; G09G 2330/021; H02M 3/156
See application file for complete search history.

(56) References Cited

U.S. PATENT DOCUMENTS

| 9,240,138 | B2 * | 1/2016 | Seo ...................... G09G 3/3208 |
| 2007/0096669 | A1 * | 5/2007 | Chang .................... H02P 6/182 |
| | | | 318/276 |
| 2009/0278521 | A1 * | 11/2009 | Omi ....................... H02M 1/36 |
| | | | 323/288 |
| 2013/0093746 | A1 * | 4/2013 | Zhao ....................... G09G 3/36 |
| | | | 345/212 |

(Continued)

*Primary Examiner* — Yuzhen Shen

(57) ABSTRACT

An output voltage regulating circuit includes a PWM IC, a voltage regulating speed control unit, a first n-type switch unit, a first capacitor, a resistor unit, and a voltage output unit, wherein the voltage regulating speed control unit includes a second switch unit, a second capacitor, a current source, and a comparator; when the PWM IC receives a signal to increase or decrease the output voltage, the PWM IC correspondingly controls the voltage output unit to increase or decrease the output voltage, and simultaneously controls the second switch unit to turn on and then cut off such that the voltage at the first terminal of the second capacitor is gradually increased, and before increasing to the reference voltage, the comparator outputs a high voltage level to turn on the first n-type switch unit such that the compensation terminal of the PWM IC is directly connected to the first capacitor.

12 Claims, 3 Drawing Sheets

(56) References Cited

U.S. PATENT DOCUMENTS

2016/0028311 A1* 1/2016 Murakami .......... H02M 3/1588
323/271
2016/0336847 A1* 11/2016 Kim .................. H02M 3/33523

* cited by examiner

OUTPUT VOLTAGE REGULATING CIRCUIT AND LIQUID CRYSTAL DISPLAY DEVICE

RELATED APPLICATIONS

This application is a National Phase of PCT Patent Application No. PCT/CN2017/114386 having International filing date of Dec. 4, 2017, which claims the benefit of priority of Chinese Patent Application No. 201710591449.3 filed on Jul. 19, 2017. The contents of the above applications are all incorporated by reference as if fully set forth herein in their entirety.

FIELD AND BACKGROUND OF THE INVENTION

The present invention relates to the technical field of display, and especially to an output voltage regulating circuit and a liquid crystal display device.

Liquid crystal display (LCD) devices have many advantages such as a thinner body, power saving, radiation free and are widely applied; for example: liquid crystal televisions, mobile phones, personal digital assistances (PDAs), digital cameras, computer screens, note book screens, etc. They have a leading position in the flat panel display field. Most liquid crystal display devices in the market now are backlit liquid crystal display devices that include a liquid crystal display panel and a backlight module. An operating principle of liquid crystal display panels is filling liquid crystal molecules between a thin film transistor array substrate (TFT array substrate) and a color filter (CF) substrate, and applying driving voltage on the two substrates to control rotation directions of the liquid crystal molecules such that light rays of the backlight module are refracted out to produce pictures.

In the conventional technology, when driving TFT-LCDs, various driving voltages including a power voltage (VDD), a turn-on voltage (VGH), a turn-off voltage (VGL) are input to the TFT-LCDs. Because various driving voltages have different voltage values, voltage output circuits including boost circuits and buck circuits are often used to perform corresponding boost or buck operations to input voltages and obtain driving voltages with specific voltage values. When operating, a voltage output circuit generally needs to work with a pulse width modulation integrated circuit (PWM IC) used for outputting pulse signals, and by changing a duty cycle of pulse signals output by the PWM IC, a ratio between turn-on time and turn-off time of field-effect transistors in a voltage output unit is controlled to realize a function of regulating output voltage output by the voltage output unit. PWM ICs used in TFT-LCDs are generally digital ICs, and by connecting to an inter-integrated circuit (I2C) bus and inputting a signal to change an output voltage through the I2C bus, a pulse signal output by them can be correspondingly changed to control the voltage output unit to correspondingly change its output voltage value. However, in the conventional technology, after the I2C bus inputting a signal to change an output voltage to the PWM IC, the PWM IC will directly change a duty cycle of its pulse signal into a duty cycle corresponding to an output voltage after changing, and, correspondingly, the voltage output unit will also directly change a current output voltage into an output voltage after changing. For example, after a signal to change an output voltage from 30 volts to 32 volts is input from the I2C bus to the PWM IC, the PWM IC directly change a duty cycle of its pulse signal into a value corresponding to 32 volts, and the voltage output unit directly change the output voltage from 30 volts to 32 volts, which will make voltage increase exceedingly fast, cause high value current, and even cause ICs to turn off.

SUMMARY OF THE INVENTION

The present invention is to provide an output voltage regulating circuit that can decrease speed of the PWM IC controlling the voltage output unit to change the output voltage after receiving a signal transmitted by the I2C bus, and increase reliability of circuits.

The present invention is also to provide a liquid crystal display device that can decrease speed of the PWM IC controlling the voltage output unit to change the output voltage after receiving a signal transmitted by the I2C bus, and increase reliability of devices.

In order to achieve the above-mentioned purpose, the present first provides an output voltage regulating circuit that includes a pulse width modulation integrated circuit (PWM IC), a voltage regulating speed control unit, a first n-type switch unit, a first capacitor, a resistor unit, and a voltage output unit.

Wherein, an input terminal of the PWM IC is electrically connected to an inter-integrated circuit (I2C) bus, a first output terminal of the PWM IC is electrically connected to the voltage regulating speed control unit, a second output terminal of the PWM IC is electrically connected to a control terminal of the voltage output unit, and a compensation terminal is electrically connected to a first terminal of the resistor unit; the voltage regulating speed control unit includes a second switch unit, a second capacitor, a current source, and a comparator; a control terminal of the second switch unit is electrically connected to the first output terminal of the PWM IC, a first terminal and a second terminal of the second switch unit are electrically connected to a first terminal and a second terminal of the second capacitor, respectively; the first terminal of the second capacitor is electrically connected to an output terminal of the current source, and the second terminal of the second capacitor is grounded; an inverting input terminal of the comparator is electrically connected to the first terminal of the second capacitor, a non-inverting input terminal of the comparator is input with a reference voltage, and an output terminal of the comparator is electrically connected to a control terminal of the first n-type switch unit; a first terminal and a second terminal of the first n-type switch unit are electrically connected to a first terminal and a second terminal of the resistor unit, respectively; a first terminal of the first capacitor is electrically connected to the second terminal of the resistor unit, and a second terminal of the first capacitor is grounded; an output terminal of the voltage output unit outputs an output voltage.

Wherein, when the input terminal of the PWM IC receives a signal to increase or decrease the output voltage by a voltage value transmitted by the I2C bus, the PWM IC outputs a control signal to the second switch unit to control the second switch unit to turn on and then cut off, and correspondingly changes a pulse signal output by the second output terminal of the PWM IC to control the voltage output unit to increase or decrease the output voltage by the voltage value.

Wherein, when the output voltage is finished increasing or decreasing by the voltage value, a voltage of the first terminal of the second capacitor is identical to the reference voltage.

Wherein, when the second capacitor is charged to saturation, a voltage of the first terminal of the second capacitor is greater than the reference voltage.

Wherein, the resistor unit includes a first resistor and a second resistor; a first terminal of the first resistor and a first terminal of the second resistor are electrically connected as the first terminal of the resistor unit, and a second terminal of the first resistor and a second terminal of the second resistor are electrically connected as the second terminal of the resistor unit.

Wherein, the first n-type switch unit and the second switch unit are a first n-type field-effect transistor and a second n-type field-effect transistor, respectively; a gate of the first n-type field-effect transistor is the control terminal of the first n-type switch unit, a source of the first n-type field-effect transistor is the second terminal of the first n-type switch unit, and a drain of the first n-type field-effect transistor is the first terminal of the first n-type switch unit; a gate of the second n-type field-effect transistor is the control terminal of the second switch unit, a source of the second n-type field-effect transistor is the second terminal of the second switch unit, and a drain of the second n-type field-effect transistor is the first terminal of the second switch unit.

Wherein, the PWM IC outputs a high voltage level control signal to control the second switch unit to turn on, and outputs a low voltage level control signal to control the second switch unit to cut off.

Wherein, the voltage regulating speed control unit is integrated on the PWM IC.

Wherein, the output voltage is a turn-on voltage.

The present invention further provides a liquid crystal display device that includes the above-mentioned output voltage regulating circuit.

The present invention further provides an output voltage regulating circuit, comprising a pulse width modulation integrated circuit (PWM IC), a voltage regulating speed control unit, a first n-type switch unit, a first capacitor, a resistor unit, and a voltage output unit.

Wherein, an input terminal of the PWM IC is electrically connected to an inter-integrated circuit (I2C) bus, a first output terminal of the PWM IC is electrically connected to the voltage regulating speed control unit, a second output terminal of the PWM IC is electrically connected to a control terminal of the voltage output unit, and a compensation terminal is electrically connected to a first terminal of the resistor unit; the voltage regulating speed control unit includes a second switch unit, a second capacitor, a current source, and a comparator; a control terminal of the second switch unit is electrically connected to the first output terminal of the PWM IC, a first terminal and a second terminal of the second switch unit are electrically connected to a first terminal and a second terminal of the second capacitor, respectively; the first terminal of the second capacitor is electrically connected to an output terminal of the current source, and the second terminal of the second capacitor is grounded; an inverting input terminal of the comparator is electrically connected to the first terminal of the second capacitor, a non-inverting input terminal of the comparator is input with a reference voltage, and an output terminal of the comparator is electrically connected to a control terminal of the first n-type switch unit; a first terminal and a second terminal of the first n-type switch unit are electrically connected to a first terminal and a second terminal of the resistor unit, respectively; a first terminal of the first capacitor is electrically connected to the second terminal of the resistor unit, and a second terminal of the first capacitor is grounded; an output terminal of the voltage output unit outputs an output voltage.

Wherein, when the input terminal of the PWM IC receives a signal to increase or decrease the output voltage by a voltage value transmitted by the I2C bus, the PWM IC outputs a control signal to the second switch unit to control the second switch unit to turn on and then cut off, and correspondingly changes a pulse signal output by the second output terminal of the PWM IC to control the voltage output unit to increase or decrease the output voltage by the voltage value.

Wherein, when the output voltage is finished increasing or decreasing by the voltage value, a voltage of the first terminal of the second capacitor is identical to the reference voltage.

Wherein, when the second capacitor is charged to saturation, the voltage of the first terminal of the second capacitor is greater than the reference voltage.

Wherein, the resistor unit includes a first resistor and a second resistor; a first terminal of the first resistor and a first terminal of the second resistor are electrically connected as the first terminal of the resistor unit, and a second terminal of the first resistor and a second terminal of the second resistor are electrically connected as the second terminal of the resistor unit.

Wherein, the first n-type switch unit and the second switch unit are a first n-type field-effect transistor and a second n-type field-effect transistor, respectively; a gate of the first n-type field-effect transistor is the control terminal of the first n-type switch unit, a source of the first n-type field-effect transistor is the second terminal of the first n-type switch unit, and a drain of the first n-type field-effect transistor is the first terminal of the first n-type switch unit; a gate of the second n-type field-effect transistor is the control terminal of the second switch unit, a source of the second n-type field-effect transistor is the second terminal of the second switch unit, and a drain of the second n-type field-effect transistor is the first terminal of the second switch unit.

Beneficial effects: the present invention provides an output voltage regulating circuit that includes a PWM IC, a voltage regulating speed control unit, a first n-type switch unit, a first capacitor, a resistor unit, and a voltage output unit, wherein the voltage regulating speed control unit includes a second switch unit, a second capacitor, a current source, and a comparator; when the input terminal of the PWM IC receives a signal to increase or decrease the output voltage by a voltage value transmitted by the I2C bus, the PWM IC correspondingly controls the voltage output unit to increase or decrease the output voltage by the voltage value, and simultaneously controls the second switch unit to turn on and then cut off such that the voltage at the first terminal of the second capacitor is gradually increased from a ground voltage, and before increasing to the reference voltage, the comparator outputs a high voltage level to turn on the first n-type switch unit such that the compensation terminal of the PWM IC is directly connected to the first terminal of the first capacitor, which can effectively decrease speed of the PWM IC controlling the voltage output unit to change the output voltage, and increase reliability of circuits. The present invention provides a liquid crystal display device that includes the above-mentioned output voltage regulating circuit that can decrease speed of the PWM IC controlling the voltage output unit to change the output voltage after receiving a signal transmitted by the I2C bus, and increase reliability of devices.

BRIEF DESCRIPTION OF THE SEVERAL VIEWS OF THE DRAWINGS

In order to further understand features and technical contents of the present invention, please refer to the following detailed description and accompanying drawings of the present invention. However, the accompanying drawings are used for purpose of explanation and do not limit the present invention.

The drawings are as the following.

DESCRIPTION OF SPECIFIC EMBODIMENTS OF THE INVENTION

In order to further describe the technical approach and the effects of the present invention, the following describes in detail with reference to advantageous embodiments and the accompanying drawings of the present invention.

Figure 1:
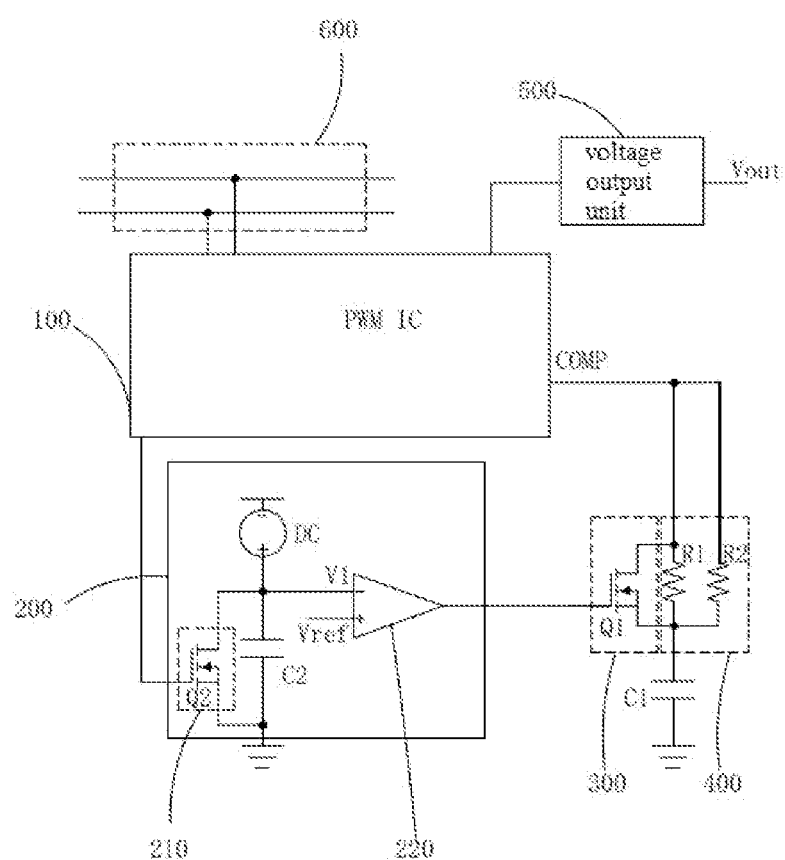
FIG. 1 is a circuit diagram of an output voltage regulating circuit according to the present invention.

Referring to FIG. 1, the present invention provides an output voltage regulating circuit that includes a pulse width modulation integrated circuit (PWM IC) 100, a voltage regulating speed control unit 200, a first n-type switch unit 300, a first capacitor C1, a resistor unit 400, and a voltage output unit 500.

An input terminal of the PWM IC 100 is electrically connected to an inter-integrated circuit (I2C) bus 600, a first output terminal of the PWM IC is electrically connected to the voltage regulating speed control unit 200, a second output terminal of the PWM IC is electrically connected to a control terminal of the voltage output unit 500, and a compensation terminal COMP is electrically connected to a first terminal of the resistor unit 400; the voltage regulating speed control unit 200 includes a second switch unit 210, a second capacitor C2, a current source DC, and a comparator 220; a control terminal of the second switch unit 210 is electrically connected to the first output terminal of the PWM IC 100, a first terminal and a second terminal of the second switch unit are electrically connected to a first terminal and a second terminal of the second capacitor C2, respectively; the first terminal of the second capacitor C2 is electrically connected to an output terminal of the current source DC, and the second terminal of the second capacitor is grounded; an inverting input terminal of the comparator 220 is electrically connected to the first terminal of the second capacitor C2, a non-inverting input terminal of the comparator is input with a reference voltage Vref, and an output terminal of the comparator is electrically connected to a control terminal of the first n-type switch unit 300; a first terminal and a second terminal of the first n-type switch unit 300 are electrically connected to a first terminal and a second terminal of the resistor unit 400, respectively; a first terminal of the first capacitor C1 is electrically connected to the second terminal of the resistor unit 400, and a second terminal of the first capacitor is grounded; an output terminal of the voltage output unit 500 outputs an output voltage Vout.

When the input terminal of the PWM IC 100 receives a signal to increase or decrease the output voltage Vout by a voltage value transmitted by the I2C bus 600, the PWM IC outputs a control signal to the second switch unit 210 to control the second switch unit 210 to turn on and then cut off, and correspondingly changes a pulse signal output by the second output terminal of the PWM IC to control the voltage output unit 500 to increase or decrease the output voltage Vout by the voltage value.

In particular, in an advantageous embodiment of the present invention, when the output voltage Vout is finished increasing or decreasing by the voltage value, a voltage of the first terminal of the second capacitor C2 is identical to the reference voltage Vref.

In particular, in an advantageous embodiment of the present invention, when the second capacitor C2 is charged to saturation, a voltage of the first terminal of the second capacitor C2 is greater than the reference voltage Vref.

In particular, the resistor unit 400 includes a first resistor R1 and a second resistor R2; a first terminal of the first resistor R1 and a first terminal of the second resistor R2 are electrically connected as the first terminal of the resistor unit 400, and a second terminal of the first resistor R1 and a second terminal of the second resistor R2 are electrically connected as the second terminal of the resistor unit 400.

In particular, the first n-type switch unit 300 and the second switch unit 210 are a first n-type field-effect transistor Q1 and a second n-type field-effect transistor Q2, respectively; a gate of the first n-type field-effect transistor Q1 is the control terminal of the first n-type switch unit 300, a source of the first n-type field-effect transistor is the second terminal of the first n-type switch unit 300, and a drain of the first n-type field-effect transistor is the first terminal of the first n-type switch unit 300. A gate of the second n-type field-effect transistor Q2 is the control terminal of the second switch unit 210, a source of the second n-type field-effect transistor is the second terminal of the second switch unit 210, and a drain of the second n-type field-effect transistor is the first terminal of the second switch unit 210. Furthermore, the PWM IC 100 outputs a high voltage level control signal to control the second switch unit 210 to turn on, and outputs a low voltage level control signal to control the second switch unit 210 to cut off.

Figure 2:
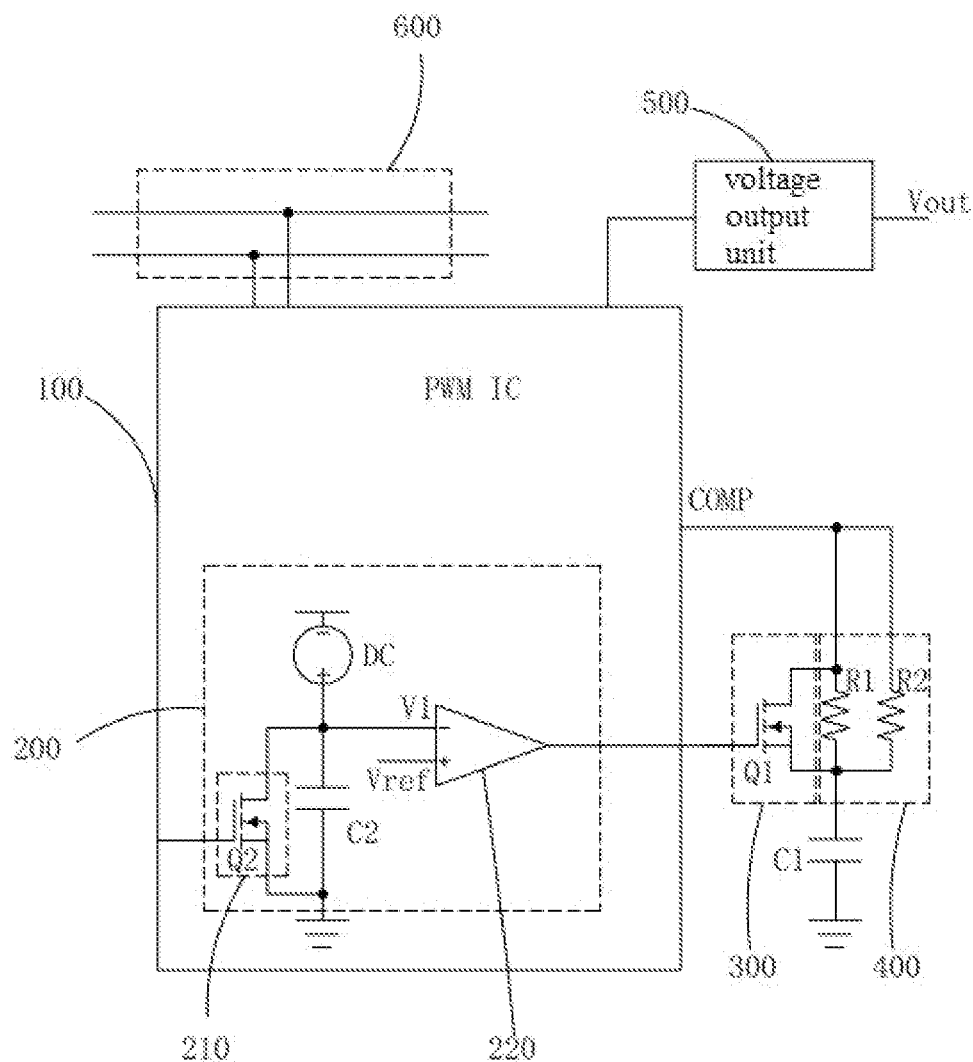
FIG. 2 is a circuit diagram of an output voltage regulating circuit according to the present invention.

In particular, the voltage regulating speed control unit 200 is integrated on the PWM IC 100, as shown in FIG. 2.

In particular, the output voltage Vout can be driving voltages often used in liquid crystal display devices such as a turn-on voltage, a turn-off voltage, a power voltage, etc.

Figure 3:
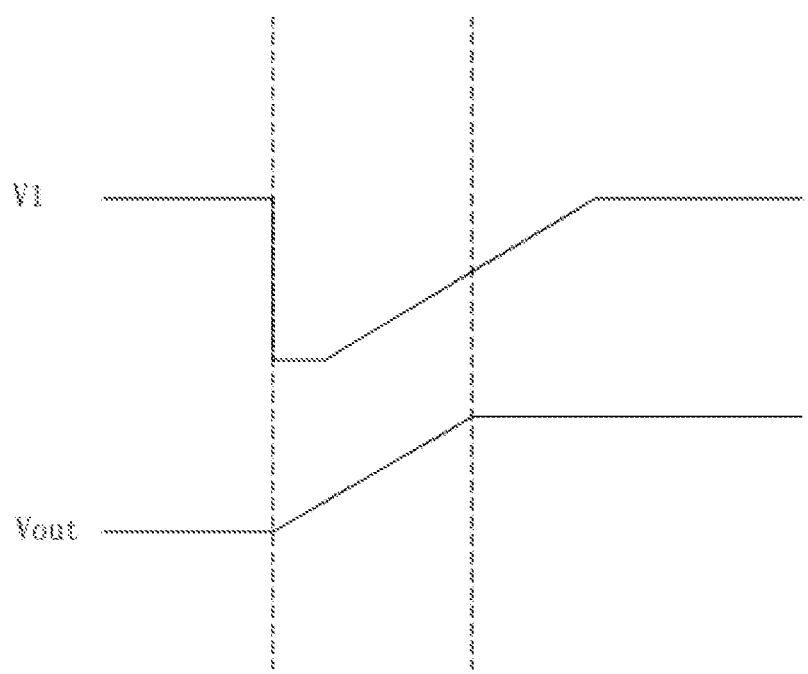
FIG. 3 is an operation timing diagram of an output voltage regulating circuit according to an advantageous embodiment of the present invention.

It should be noted that, referring to FIG. 1 and FIG. 3, an advantageous embodiment of the present invention illustrates an operating process of an output voltage regulating circuit according to the present invention.

Before regulating an output voltage, the output voltage Vout output by the voltage output unit 500 is constant, the PWM IC 100 outputs a control signal to control the second switch unit 210 to cut off, and the second capacitor C2 is charged to a saturation state through the current source DC. At this time, voltage V1 at the first terminal of the second capacitor C2 is greater than the reference voltage Vref, the output terminal of the comparator 220 outputs a low voltage level, the first n-type switch unit 300 is cut off, and the compensation terminal COMP of the PWM IC 100 is grounded through the resistor unit 400 and the first capacitor C1 to form a compensation network structure.

When regulating the output voltage, the I2C bus 600 transmits to the PWM IC 100 a signal to increase or decrease the output voltage Vout by a voltage value, the PWM IC 100 outputs a control signal to the second switch unit 210 to control the second switch unit 210 to turn on and then cut off such that the voltage V1 at the first terminal of the second capacitor C2 is discharged to a ground voltage, and then the voltage V1 at the first terminal of the second capacitor C2 is gradually increased through charging from the current source DC. At the same time, the PWM IC 100 correspondingly changes a pulse signal output by the second output terminal of the PWM IC to control the voltage output unit 500 to correspondingly increase or decrease the output voltage Vout. Before the voltage V1 at the first terminal of the second capacitor C2 is increased to the reference voltage Vref, the output terminal of the comparator 220 always outputs a high voltage level such that the first n-type switch unit 300 is always conductive, and thereby when the PWM IC 100 controls the voltage output unit 500 to increase or decrease the output voltage Vout, the compensation terminal COMP of the PWM IC 100 is grounded directly through the first capacitor C1. In the conventional technology, the greater the resistance of resistors in a compensation network structure externally connected by the compensation terminal COMP of the PWM IC is, the faster the response of the PWM IC is, that is, the faster the speed of the PWM IC outputting the pulse signal to control the voltage output unit to change the output voltage is. Therefore, in the present invention, when regulating the output voltage Vout, because the first n-type switch unit 300 is always conductive, resistance externally connected by the compensation terminal COMP is extremely small such that response of the PWM IC 100 becomes slow, that is, speed of the PWM IC 100 changing the pulse signal output by the second output terminal of the PWM IC to control the voltage output unit 500 to increase or decrease the output voltage Vout is decreased, which can effectively prevent high value current caused by exceedingly fast voltage variation, ensure normal operation of an output voltage regulating circuit and a liquid crystal display device, and increase reliability when applied to liquid crystal display devices. When the voltage V1 at the first terminal of the second capacitor C2 is increased to be greater than the reference voltage Vref, the output terminal of the comparator 220 outputs a low voltage level such that the first n-type switch unit 300 is cut off. At this time, the output voltage Vout is finished increasing or decreasing by a voltage value corresponding to a signal transmitted by the I2C bus 600, and the compensation terminal COMP of the PWM IC 100 is grounded again through the resistor unit 400 and the first capacitor C1 and resumes a compensation network structure before regulating the output voltage. After this, the current source DC continues to charge the first terminal of the second capacitor C2 until the second capacitor C2 is charged to saturation. Furthermore, after finishing regulating the output voltage and charging the second capacitor C2 to saturation one time, a course of regulating the output voltage can be repeated many times to continually increase or decrease the output voltage Vout by a same or different voltage values, and finally make the output voltage Vout vary to a voltage value satisfying requirements.

Based on a same thought of invention, the present invention further provides a liquid crystal display device including the above-mentioned output voltage regulating circuit that can decrease speed of the PWM IC controlling the voltage output unit to change the output voltage after receiving a signal transmitted by the I2C bus, and increase reliability of devices. Repeat description of a structure of the output voltage regulating circuit is omitted here.

In summary, an output voltage regulating circuit according to the present invention includes a PWM IC, a voltage regulating speed control unit, a first n-type switch unit, a first capacitor, a resistor unit, and a voltage output unit, wherein the voltage regulating speed control unit includes a second switch unit, a second capacitor, a current source, and a comparator; when the input terminal of the PWM IC receives a signal to increase or decrease the output voltage by a voltage value transmitted by the I2C bus, the PWM IC correspondingly controls the voltage output unit to increase or decrease the output voltage by the voltage value, and simultaneously controls the second switch unit to turn on and then cut off such that the voltage at the first terminal of the second capacitor is gradually increased from a ground voltage, and before increasing to the reference voltage, the comparator outputs a high voltage level to turn on the first n-type switch unit such that the compensation terminal of the PWM IC is directly connected to the first terminal of the first capacitor, which can effectively decrease speed of the PWM IC controlling the voltage output unit to change the output voltage, and increase reliability of circuits. A liquid crystal display device according to the present invention includes the above-mentioned output voltage regulating circuit that can decrease speed of the PWM IC controlling the voltage output unit to change the output voltage after receiving a signal transmitted by the I2C bus, and increase reliability of devices.

Although the present invention has been explained in relation to its preferred embodiment, it does not intend to limit the present invention. It is obvious to those skilled in the art having regard to this present invention that other modifications of the exemplary embodiments beyond these embodiments specifically described here may be made without departing from the spirit of the invention. Accordingly, such modifications are considered within the scope of the invention as limited solely by the appended claims.

What is claimed is:

1. An output voltage regulating circuit, comprising a pulse width modulation integrated circuit (PWM IC), a voltage regulating speed control unit, a first n-type switch unit, a first capacitor, a resistor unit, and a voltage output unit; wherein an input terminal of the PWM IC is electrically connected to an inter-integrated circuit (I2C) bus, a first output terminal of the PWM IC is electrically connected to the voltage regulating speed control unit, a second output terminal of the PWM IC is electrically connected to a control terminal of the voltage output unit, and a compensation terminal is electrically connected to a first terminal of the resistor unit; the voltage regulating speed control unit comprises a second switch unit, a second capacitor, a current source, and a comparator; a control terminal of the second switch unit is electrically connected to the first output terminal of the PWM IC, a first terminal and a second terminal of the second switch unit are electrically connected to a first terminal and a second terminal of the second capacitor, respectively; the first terminal of the second capacitor is electrically connected to an output terminal of the current source, and the second terminal of the second capacitor is grounded; an inverting input terminal of the comparator is electrically connected to the first terminal of the second capacitor, a non-inverting input terminal of the comparator is input with a reference voltage, and an output terminal of the comparator is electrically connected to a control terminal of the first n-type switch unit; a first terminal and a second terminal of the first n-type switch unit are electrically connected to a first terminal and a second terminal of the resistor unit, respectively; a first terminal of the first capacitor is electrically connected to the second terminal of the resistor unit, and a second terminal of the first capacitor is grounded; an output terminal of the voltage output unit outputs an output voltage;

when the input terminal of the PWM IC receives a signal to increase or decrease the output voltage by a voltage value transmitted by the I2C bus, the PWM IC outputs a control signal to the second switch unit to control the second switch unit to turn on and then cut off, and correspondingly changes a pulse signal output by the second output terminal of the PWM IC to control the voltage output unit to increase or decrease the output voltage by the voltage value, wherein the resistor unit comprises a first resistor and a second resistor; a first terminal of the first resistor and a first terminal of the second resistor are electrically connected as the first terminal of the resistor unit, and a second terminal of the first resistor and a second terminal of the second resistor are electrically connected as the second terminal of the resistor unit.

2. The output voltage regulating circuit as claimed in claim 1, wherein when the output voltage is finished increasing or decreasing by the voltage value, a voltage of the first terminal of the second capacitor is identical to the reference voltage.

3. The output voltage regulating circuit as claimed in claim 1, wherein when the second capacitor is charged to saturation, a voltage of the first terminal of the second capacitor is greater than the reference voltage.

4. The output voltage regulating circuit as claimed in claim 1, wherein the first n-type switch unit and the second switch unit are a first n-type field-effect transistor and a second n-type field-effect transistor, respectively; a gate of the first n-type field-effect transistor is the control terminal of the first n-type switch unit, a source of the first n-type field-effect transistor is the second terminal of the first n-type switch unit, and a drain of the first n-type field-effect transistor is the first terminal of the first n-type switch unit; a gate of the second n-type field-effect transistor is the control terminal of the second switch unit, a source of the second n-type field-effect transistor is the second terminal of the second switch unit, and a drain of the second n-type field-effect transistor is the first terminal of the second switch unit.

5. The output voltage regulating circuit as claimed in claim 4, wherein the PWM IC outputs a high voltage level control signal to control the second switch unit to turn on, and outputs a low voltage level control signal to control the second switch unit to cut off.

6. The output voltage regulating circuit as claimed in claim 1, wherein the voltage regulating speed control unit is integrated on the PWM IC.

7. The output voltage regulating circuit as claimed in claim 1, wherein the output voltage is a turn-on voltage.

8. A liquid crystal display device, comprising the output voltage regulating circuit as claimed in claim 1.

9. An output voltage regulating circuit, comprising a pulse width modulation integrated circuit (PWM IC), a voltage regulating speed control unit, a first n-type switch unit, a first capacitor, a resistor unit, and a voltage output unit; wherein
an input terminal of the PWM IC is electrically connected to an inter-integrated circuit (I2C) bus, a first output terminal of the PWM IC is electrically connected to the voltage regulating speed control unit, a second output terminal of the PWM IC is electrically connected to a control terminal of the voltage output unit, and a compensation terminal is electrically connected to a first terminal of the resistor unit; the voltage regulating speed control unit comprises a second switch unit, a second capacitor, a current source, and a comparator; a control terminal of the second switch unit is electrically connected to the first output terminal of the PWM IC, a first terminal and a second terminal of the second switch unit are electrically connected to a first terminal and a second terminal of the second capacitor, respectively; the first terminal of the second capacitor is electrically connected to an output terminal of the current source, and the second terminal of the second capacitor is grounded; an inverting input terminal of the comparator is electrically connected to the first terminal of the second capacitor, a non-inverting input terminal of the comparator is input with a reference voltage, and an output terminal of the comparator is electrically connected to a control terminal of the first n-type switch unit; a first terminal and a second terminal of the first n-type switch unit are electrically connected to a first terminal and a second terminal of the resistor unit, respectively; a first terminal of the first capacitor is electrically connected to the second terminal of the resistor unit, and a second terminal of the first capacitor is grounded; an output terminal of the voltage output unit outputs an output voltage;

when the input terminal of the PWM IC receives a signal to increase or decrease the output voltage by a voltage value transmitted by the I2C bus, the PWM IC outputs a control signal to the second switch unit to control the second switch unit to turn on and then cut off, and correspondingly changes a pulse signal output by the second output terminal of the PWM IC to control the voltage output unit to increase or decrease the output voltage by the voltage value;

wherein when the output voltage is finished increasing or decreasing by the voltage value, a voltage of the first terminal of the second capacitor is identical to the reference voltage;

wherein when the second capacitor is charged to saturation, the voltage of the first terminal of the second capacitor is greater than the reference voltage;

wherein the resistor unit comprises a first resistor and a second resistor; a first terminal of the first resistor and a first terminal of the second resistor are electrically connected as the first terminal of the resistor unit, and a second terminal of the first resistor and a second terminal of the second resistor are electrically connected as the second terminal of the resistor unit;

wherein the first n-type switch unit and the second switch unit are a first n-type field-effect transistor and a second n-type field-effect transistor, respectively; a gate of the first n-type field-effect transistor is the control terminal of the first n-type switch unit, a source of the first n-type field-effect transistor is the second terminal of the first n-type switch unit, and a drain of the first n-type field-effect transistor is the first terminal of the first n-type switch unit; a gate of the second n-type field-effect transistor is the control terminal of the second switch unit, a source of the second n-type field-effect transistor is the second terminal of the second switch unit, and a drain of the second n-type field-effect transistor is the first terminal of the second switch unit.

10. The output voltage regulating circuit as claimed in claim 9, wherein the PWM IC outputs a high voltage level control signal to control the second switch unit to turn on, and outputs a low voltage level control signal to control the second switch unit to cut off.

11. The output voltage regulating circuit as claimed in claim 9, wherein the voltage regulating speed control unit is integrated on the PWM IC.

12. The output voltage regulating circuit as claimed in claim 9, wherein the output voltage is a turn-on voltage.

* * * * *